United States Patent [19]

Gomi et al.

[11] 4,118,741
[45] Oct. 3, 1978

[54] HUE ADJUSTING CIRCUITS

[75] Inventors: Hiroshi Gomi; Shinichiro Taguchi, both of Fukaya, Japan

[73] Assignee: Tokyo Shibaura Electric Co., Ltd., Kawasaki, Japan

[21] Appl. No.: 769,784

[22] Filed: Feb. 17, 1977

[30] Foreign Application Priority Data

Feb. 18, 1976 [JP] Japan .................................. 51-15838
Mar. 9, 1976 [JP] Japan .................................. 51-24648

[51] Int. Cl.² ........................ H04N 9/50; H04N 9/535
[52] U.S. Cl. ......................................... 358/28; 358/25
[58] Field of Search .............................. 358/28, 25, 23

[56] References Cited

U.S. PATENT DOCUMENTS

| 2,964,588 | 12/1960 | Rhodes | 358/23 |
| 3,133,987 | 5/1964 | Palladino | 358/23 |
| 3,527,964 | 9/1970 | Hansen et al. | 358/28 |
| 3,575,549 | 4/1971 | Hepner et al. | 358/28 |
| 3,781,701 | 12/1973 | Cecchin et al. | 358/28 |
| 3,876,934 | 4/1975 | Okada et al. | 358/28 |

Primary Examiner—John C. Martin
Attorney, Agent, or Firm—Cushman, Darby & Cushman

[57] ABSTRACT

In a circuit for processing a chroma signal the chroma signal is applied to a demodulator through a first phase shifter. The burst signal is applied to an automatic phase adjusting circuit including a phase detection circuit and a voltage-controlled oscillator. The output of the phase adjusting circuit is applied to a hue adjusting circuit including a second phase shifter and a mixing circuit connected to receive the output of the phase adjusting circuit and the output of the second phase shifter. A control voltage is applied to the mixing circuit for controlling the relative amplitude of the two inputs applied to the mixing circuit. The output of the hue adjusting circuit is applied to the demodulator to act as the subcarrier signal for demodulating the chroma signal. The first and second phase shifters are each comprised of a resistor and a capacitor and formed on the same integrated circuit semiconductor substrate.

8 Claims, 14 Drawing Figures

HUE ADJUSTING CIRCUITS

BACKGROUND OF THE INVENTION

This invention relates to a signal processing circuit especially suitable for use in a colour television receiver.

In a colour television receiving set, in order to correctly demodulate the hue of a colour signal by a chroma signal processing circuit a hue adjusting circuit is provided so as to establish a correct phase relationship between the chroma signal and the subcarrier reference signal. The hue adjusting circuit is generally constructed such that the correct phase relationship is established usually at the center of the phase variable range. When such processing circuit is incorporated into an integrated circuit, two signals are phase shifted by different phase shifting circuits and then the two dephased signals are combined by a mixing circuit which varies the relative amplitude of the two input signals by a control voltage, to thereby vary the phase of the composite signal.

If the constituent elements of the phase shifting circuit have process variations, the phase and amplitude of the resulting signal are also different from desired values so that when such phase shifted signals are combined together, the phase of the composite signal would also vary. Even in the absence of such process variations it is difficult to obtain a signal having an optimum phase due to the phase shift errors caused by the chroma signal path, burst signal path and subcarrier signal path, etc. As a consequence, even if the control voltage is set at the center of the variable range it is impossible to provide a correct and optimum demodulation phase. In order to obtain the optimum phase it is necessary to decrease as far as possible the variations of the signal processing circuit and the hue adjusting circuit from the prescribed design. Since the former variation is caused by the signal processing circuit it is not easy to correct it, but the latter variation can be corrected relatively readily. For this reason, it has been the usual practice to decrease the phase shift variation, by decreasing the process variations of the component elements that are used to construct the phase shifting circuits. To decrease the variations the elements should be manufactured at high accuracies. However, this measure increases the manufacturing cost. High accuracy of manufacturing of the component elements renders it difficult to incorporate them into an integrated circuit. Accordingly, it has been obliged to construct the phase shifting circuits on the outside of the integrated circuit and the mixing circuit is incorporated into the integrated circuit. Even in such a case, since there are a number of external component elements, it is necessary to provide a number of terminals for the integrated circuit.

Generally in a colour television receiving set the appropriate demodulation of the chroma signal is made by designing a hue adjusting circuit to operate in a variable phase range by taking into consideration the deviation of the phase shift made by the signal path of the chroma signal processing circuit. Where the variable phase range is wide, it is possible to adjust the demodulation phase to an optimum value. However, the viewer of the colour television receiving set is required to adjust the circuit to obtain the optimum hue. For this reason it is desirable that the variable phase range should be narrow.

Accordingly, it is an object of this invention to provide an improved signal processing circuit especially suitable for processing a colour signal received by a colour television receiving set.

Another object of this invention is to provide a signal processing circuit which makes it possible to readily obtain an optimum hue irrespective of the variations of the characteristics of the circuit elements.

Another object of this invention is to provide an improved colour signal processing circuit capable of setting an optimum modulation phase always at the center of a voltage for controlling the hue adjusting circuit thereby enabling the optimum demodulation phase even when the hue adjusting range is set narrow.

Still another object of this invention is to provide an improved signal processing circuit capable of readily incorporating the circuit elements of a phase shifter utilized in the processing circuit into an integrated circuit thereby eliminating the effect of deviation of the characteristics of the circuit elements.

A further object of this invention is to provide a signal processing circuit which makes it possible to form a plurality of circuit elements having different functions such as capacitors, resistors and transistors on the same semiconductor chip thereby decreasing the number of the connecting pins of the integrated circuit.

According to one aspect of this invention there is provided a signal processing circuit for use in a colour television receiving set comprising an input terminal for receiving a chroma signal, a burst gate circuit for deriving burst signals from said chroma signal and, a first phase shifter for shifting the phase of said chroma signal, a demodulator connected to the output of said first phase shifter, a hue adjusting circuit including a second phase shifter for adjusting the phase of said burst signal and a mixing circuit for mixing said burst signal and the output of said second phase shifter, and means for supplying the output of said mixing circuit to said demodulator for demodulating said chroma signal.

According to another aspect of this invention there is provided a signal processing circuit for use in a color television receiving set comprising a hue adjusting circuit connected to receive a chroma signal and including a phase shifting circuit means for shifting the phase of said chroma signal and mixing circuit means for mixing the chroma signal and the output signal of said phase shifting means, the relative amplitude ratio between the chroma signal and the output signal of said phase shifting means being controlled by a control voltage applied to said mixing circuit; a burst gate circuit for deriving burst signals from the output signal of said mixing circuit; a subcarrier producing circuit responsive to the burst signal to produce subcarrier signals in phase with the burst signal; and a demodulator connected to receive the chroma signal from said phase shifting means and the subcarrier signal from said subcarrier producing circuit for demodulating the chroma signal.

This invention can be more fully understood from the following detailed description when taken in conjunction with the accompanying drawings, in which.

Figures 1, 9:
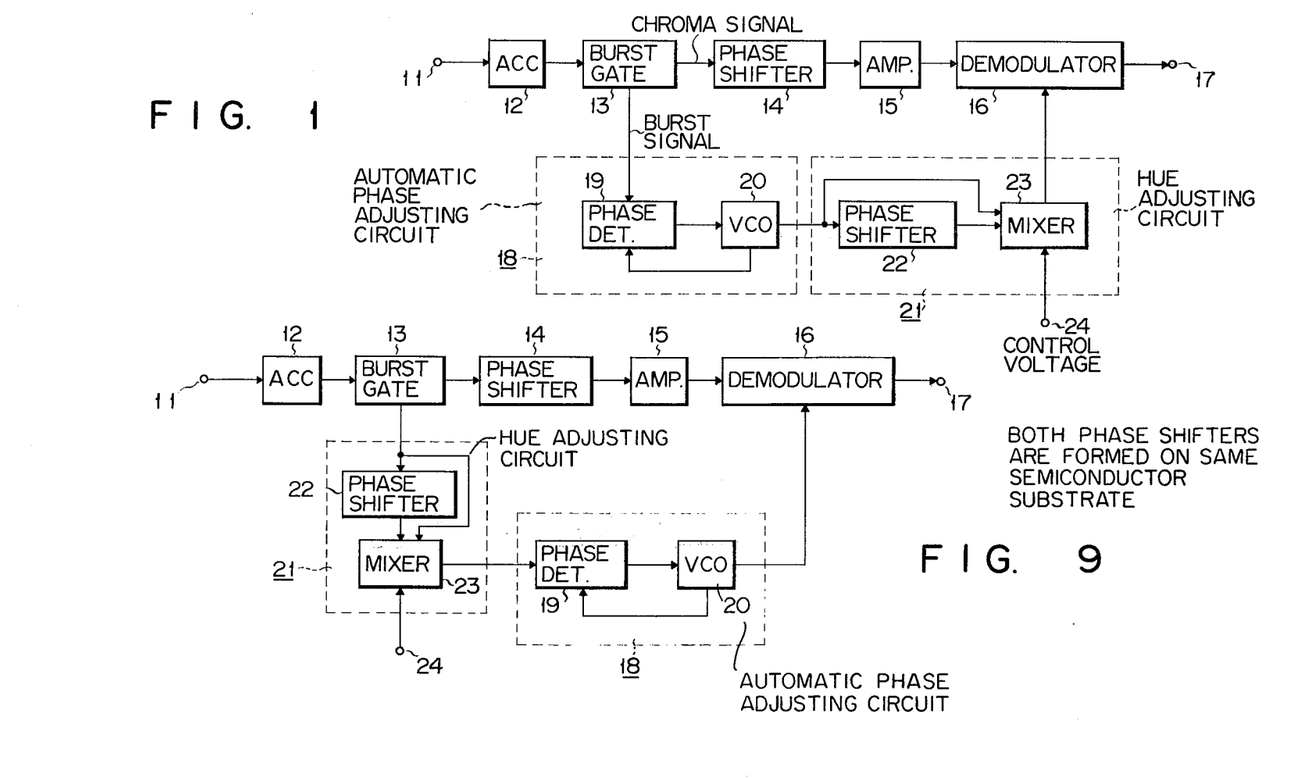
FIG. 1 is a block diagram of one example of the signal processing circuit as applied to a colour television receiving set.
FIG. 9 is a block diagram showing a modified embodiment of this invention.

FIG. 1 shows only the circuit assuring an optimum demodulation phase of the chroma signal processing circuit. A colour adjusting circuit (generally termed ACC) 12 for automatically controlling the amplitude of the chroma signal is connected to an input terminal 11 connected to receive the chroma signal. The output of the colour adjusting circuit 12 is connected to a burst gate circuit 13 which functions to separate the output into a chroma signal and a burst signal. The output the burst gate circuit 13 is applied to a chroma signal amplifier 15 through a phase shifter 14. Usually the chroma signal amplifier 15 is subject to a colour control and a killer control. The output of the amplifier 15 is coupled with a demodulator 16 having an output terminal 17. An automatic phase adjusting circuit 18 is connected to the burst gate circuit 13 and comprises a phase detection circuit 19 connected to the burst gate circuit 13 and a voltage-controlled oscillator 20 for producing a subcarrier reference signal. A portion of the output of the oscillator 20 is fed back to the phase detection circuit 19. The hue adjusting circuit 21 is constituted by a phase shifter 22 connected to the oscillator 20 and a mixing circuit 23 connected to the outputs of the oscillator 20 and the phase shifter 22. The mixing circuit 23 is supplied with a control voltage signal from an input terminal 24 and the output of the mixing circuit 23 is applied to the demodulator 16.

When a colour composite signal containing a chroma signal and a burst signal is applied to the input terminal 11, the amplitude of the colour composite signal is controlled by the colour adjusting circuit 12 and the colour signal is then applied to the burst gate circuit 13, to be separated into the chroma signal and the burst signal. Now assume that the phase shift angles of the chroma signal provided by the burst gate circuit 13, the phase shifter 14 and the amplifier 15 are $\phi_2$, $\phi_p$ and $\phi_3$, respectively. The output of the amplifier 15 is supplied to demodulator 16. The burst signal separated by the burst gate circuit 13 providing a phase shift angle of $\phi_B$ to the burst signal is supplied to the phase detection circuit 19 which detects the phase difference between the burst signal and the reference subcarrier signal generated by the oscillator 20 to produce a control signal. The control signal is applied to the oscillator 20 so as to cause the subcarrier reference signal to be in phase with the burst signal. The output of the oscillator 20 controlled in this manner is applied to a phase shifter 22 of the hue adjusting circuit 21 and delayed in its phase by $\phi_H$. The phase delayed subcarrier signal is applied to the mixing circuit 23 in which it is mixed with the output from the oscillator not passing through the phase shifter and the relative amplitude of these two input signals is controlled by the control signal supplied to the control terminal 24 thereby producing the subcarrier reference signal having a phase of $\phi_s$. This subcarrier reference signal is supplied to the demodulator 16 for demodulating color information from the chroma signal. The demodulated signal is applied to a colour picture tube through output terminal 17.

In order that a correct hue is reproduced, the chroma signal and the subcarrier reference signal applied to the demodulator should have a correct demodulation phase difference. The phase difference $\phi$ between the chroma signal and the subcarrier signal is $$\phi = \theta_c - \theta_s = \phi_2 + \phi_P + \phi_3 - (\phi_B + \phi_H + \phi_a) \quad (1)$$

where $\theta_c$ shows the phase of the output of the chroma signal amplifier, $\theta_s$ shows the phase of the output signal of the mixing circuit and $\phi_a$ is a phase difference between input and output of the automatic phase adjusting circuit 18.

The phase difference $\phi_H$ between the input and output of the hue adjusting circuit 21 is expressed by an equation.

$$\phi_H = \phi_{HO} + \beta\psi \quad (2)$$

where $\phi_{HO}$ represents the phase shift angle of the phase shifting circuit 22, $\beta$ represents a variable which varies between $-\beta m$ to $\beta p$ ($\beta m > 0$, $\beta p > 0$, $\beta m = \beta p$, and $\beta = 0$ at the center of the variable range of the control voltage Ec), $\psi$ represents the amount of phase shift between the input and output of the hue adjusting circuit 21 dependent on the control voltage Ec.

From equations (1) and (2)

$$\phi = \phi_k + (\phi_p - \phi_{HO} - \beta\psi) \quad (3)$$

where $\phi_k = \phi_2 + \phi_3 - \phi_B - \phi_a$

Thus, the value of $\phi_k$ is determined by the constants of the signal processing circuit. Suppose now that the optimum modulation phase $\phi_0$ can be obtained at the center of the control voltage, that is at $\beta = 0$, the following equation is applicable.

$$\phi_0 = \phi_k + \phi_p - \phi_{HO} \quad (4)$$

Where $\phi_k$, $\phi_p$ and $\phi_{HO}$ have variations of $\Delta\phi_k$, $\Delta\phi_p$ and $\Delta\phi_{HO}$ respectively, the variation $\Delta\phi_0$ of $\phi_0$ is expressed by an equation $$\Delta\phi_0 = \Delta\phi_k + \Delta\phi_p - \Delta\phi_{HO} \quad (5)$$

When the phase shifters 14 and 22 are designed to satisfy then $\Delta\phi_p \approx \Delta\phi_{HO}$, a condition $\Delta\phi_0 = \Delta\phi_k$. Even when $\Delta\phi_p$ is not nearly equal to $\Delta\phi_{HO}$, if $\Delta\phi_p$ and $\Delta\phi_{HO}$ have the same sign $\Delta\phi_0$ can be made small. Then it is not necessary for the hue adjusting circuit 21 to compensate for its variation by itself. Thus, it is only necessary to adjust the variation $\Delta\phi_k$ caused by the signal circuit alone. In other words, it is possible to decrease the phase adjusting range of the hue adjusting circuit 21. For this reason, a hue obtained when the control voltage is at an extreme end of adjusting range is not displaced so much from the optimum hue. Accordingly the viewer can readily adjust the circuit to obtain the optimum hue.

Figure 2:
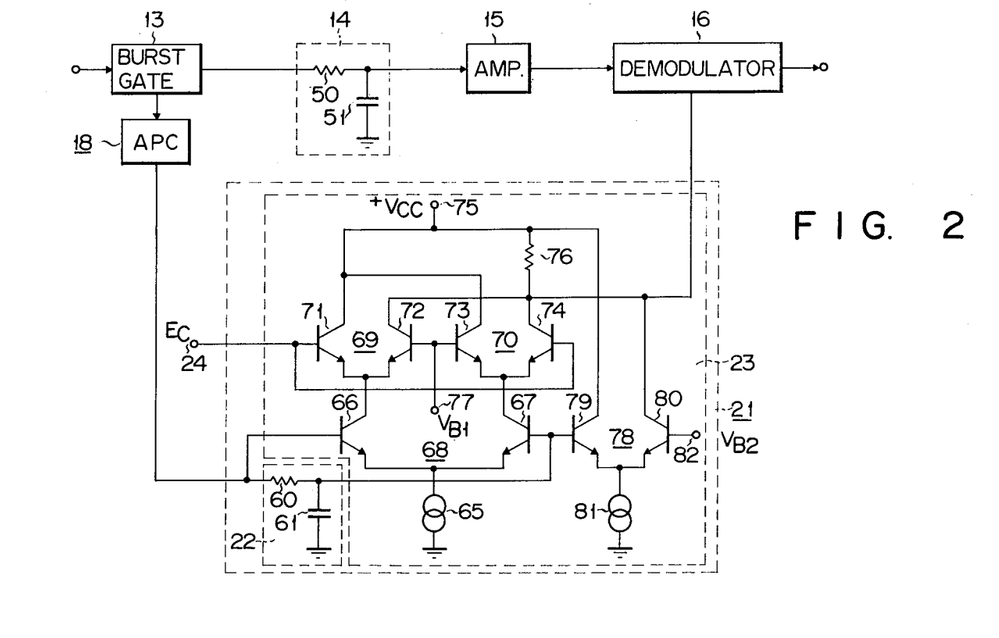
FIG. 2 is a block diagram showing the detail of the hue adjusting circuit shown in FIG. 1.

FIG. 2 shows the detail of the phase shifter 14 and the hue adjusting circuit 21 of the signal processing circuit shown in FIG. 1. The phase shifter 14 is constructed to retard the phase of input signal. More particularly, it comprises a resistor 50 connected between the burst gate circuit 13 and the amplifier 15 and a capacitor 51 connected between the juncture between the resistor 50 and the amplifier 15 and ground. In the same manner, the phase shifter 22 of the hue adjusting circuit 21 comprises a resistor 60 connected between the automatic phase adjusting circuit 18 and the mixing circuit 23, and a capacitor 61 connected between the junction between the resistor 60 and the mixing circuit and ground. The mixing circuit 23 comprises a first differential amplifier 68 constituted by first and second transistors 66 and 67 having base electrodes connected to the input and output sides respectively of the phase shifting circuit 22 and emitters commonly connected to a constant current source 65. The collector electrodes of transistors 66 and 67 are connected to the commonly connected emitters of third and fourth transistors 71 and 72 and of fifth and sixth transistors 73 and 74 respectively constituting second and third differential amplifiers 69 and 70. The collector electrodes of the third and fifth transistors 71 and 73 are connected together, and the collector electrodes of the fourth and sixth transistors 72 and 74 are also connected together to form a double-balanced type differential amplifier. A load resistor 76 is connected between the commonly connected collector electrodes of the transistors 72 and 74 and a source terminal 75 whereas the collector electrodes of transistors 71 and 73 are connected directly to the source terminal 75. The base electrodes of the third and sixth transistors 71 and 74 are connected to the control voltage terminal 24, whereas the base electrodes of the fourth and fifth transistors 72 and 73 are connected to a bias voltage terminal 77 ($V_{B1}$). The output of the phase shifter 22 is connected to the base electrode of a seventh transistor 79 which constitutes the fourth differential amplifier 78 together with an eighth transistor 80 and the emitter electrodes of transistors 79 and 80 are connected to a second constant current source 81. The base electrode of transistor 80 is connected to a bias voltage source 82 ($V_{B2}$), and the collector electrode is connected to the demodulator 16 together with the collector electrodes of transistors 72 and 74. The collector electrode of the seventh transistor 79 is connected to the source terminal 75.

Figure 3:
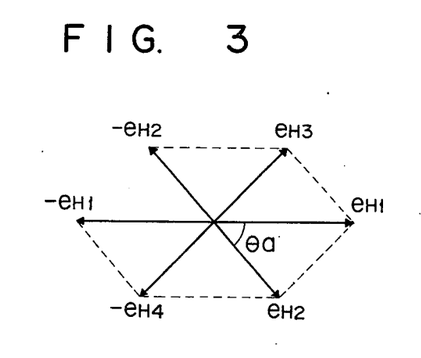
FIG. 3 is a vector diagram showing the operation of the phase shifter utilized in the hue adjusting circuit.

Denoting the input signal to the hue adjusting circuit 21, that is the input signal to the phase shifter 22 and the base electrode of the first transistor 66 by $\mathring{e}_{H1}$, the phase of the output signal $\mathring{e}_{H2}$ of the phase shifter 22 is delayed by $\theta_a$. These phase relationships are shown by the vector diagram in FIG. 3. In this case, only the phase relationship is considered and the gains of circuits are neglected. The input signal $\mathring{e}_{H1}$ and the output signal $\mathring{e}_{H2}$ of the phase shifter 22 is applied to the base electrodes of the first transistor 66 and the base electrodes of the second and seventh electrodes 67 and 79 respectively. As a consequence, by the differential action of the first and second transistors 66 and 67 difference signals $-\mathring{e}_{H3}$ and $\mathring{e}_{H3}$ of signals $\mathring{e}_{H1}$ and $\mathring{e}_{H2}$ appear on the collector electrodes of these transistors. Signals $-\mathring{e}_{H3}$ and $\mathring{e}_{H3}$ are supplied to the commonly connected emitters of the transistors 71, 72 and transistors 73, 74 of the second and third differential amplifiers 69 and 70 respectively. The second and third differential amplifiers constitute a so-called double-balanced differential amplifier which adds signals $-\mathring{e}_{H3}$ and $\mathring{e}_{H3}$ at the collector juncture of the fourth and sixth transistors 72 and 74. By the action of the control voltage from the control voltage terminal 24 the relative amplitude ratio of the signal $-\mathring{e}_{H3}$ to $\mathring{e}_{H3}$ is adjusted. Since the output signal $\mathring{e}_{H2}$ from the phase shifter 22 is also applied to the base electrode of the seventh transistor 79 of the fourth differential amplifier 78 an output $\mathring{e}_{H2}$ appears on the collector electorde of the eighth transistor 80 which is added to the output signals from the second and third differential amplifiers 69 and 70 at the juncture of the collector electrodes of the fourth and sixth transistors 72 and 74 to produce an output signal $\mathring{e}_{HO}$ of the hue adjusting circuit 21. This output signal $\mathring{e}_{HO}$ is expressed as follows.

$$\mathring{e}_{HO} = K_1 \{\alpha \mathring{e}_{H3} + (1 - \alpha)\mathring{e}_{H3}\} - K_2 \mathring{e}_{H2} \tag{6}$$

where $\alpha$ is a variable which varies inproportion to the control voltage and expressed by $0 \leq \alpha \leq 1$ and $K_1$ and $K_2$ are transfer constants. The center value of the variable control voltage $E_c$ is obtained where it is equal to the bias voltage $V_{B1}$ applied to terminal 77. The circuit is set such that $\alpha = \frac{1}{2}$ at this time. The bias voltage $V_{B2}$ is produced within the integrated circuit.

When $\alpha = \frac{1}{2}$, equation (6) can be rewritten as follows:

$$\mathring{e}_{HO} = K_2 \mathring{e}_{H2} \tag{7}$$

When the center value of the control voltage $E_c$ is equal to the bias voltage $V_{B1}$, $\beta = 0$, so that equation (2) can be rewritten as follows:

$$\phi_H = \phi_{HO} = \theta_a \tag{8}$$

Figure 4:
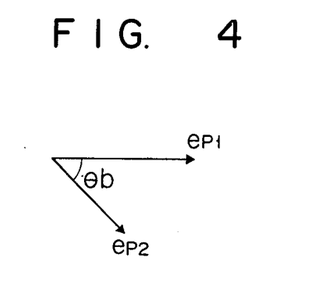
FIG. 4 is a vector diagram showing the operation of the phase shifter utilized in the circuit of the chromatic signal.

The phase of the input voltage $\mathring{e}_{p1}$ to the phase shifter 14 is lagged by $\theta_b$ to produce an output signal $\mathring{e}_{p2}$. This operation is shown by a vector diagram shown in FIG. 4. Thus, the phase difference $\phi_p$ between the input and output of the phase shifter 14 is $$\phi_p = \theta_b \tag{9}$$

$\theta_a$ and $\theta_b$ in equations (8) and (9) are expressed by the following equations $$\theta_a = \tan^{-1}(-C_1 R_1) \tag{10}$$

$$\theta_b = \tan^{-1}(-\omega w C_2 R_2) \tag{11}$$

where $\omega = 2\pi f$, $f$ represents frequency, $C_1$ the capacitance of capacitor 61, $R_1$ the resistance of resistor 60, $C_2$ the capacitance of capacitance 51 and $R_2$ the resistrance of resistor 50.

Figure 5:
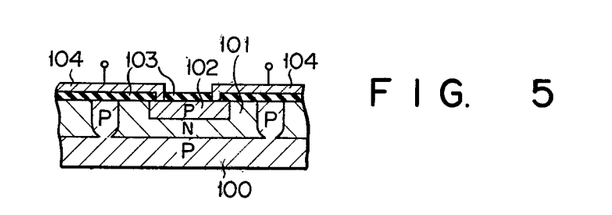
FIGS. 5, 6 and 7 are sectional views showing some constructions of transistors capable of providing a resistor and a capacitor utilized to construct a phase shifter.
Figure 6:
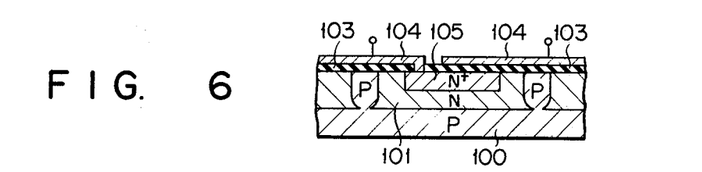
Figure 7:
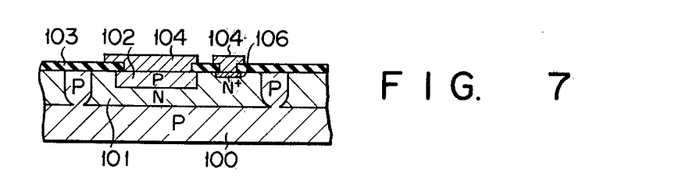

In incorporating the phase shifters 14 and 22 into an integrated circuit, resistors 50, 60 and capacitors 51 and 61 can be formed on the same semiconductor chip. For exmaple, as shown in FIG. 5, resistor 50 and 60 can be formed by forming by diffusion an N type layer 101 and a P type layer 102 on a P type substrate 100, applying a silicon oxide film 103 on the diffused area of the substrate 100, forming two perforations through the oxide film 103 to reach the P type layer 102, vapour depositing electrically isolated aluminium films 104 to bridge the perforations, and utilizing the aluminum film 104 as the terminal electrode for the P type layer 102. The resistance of the P type layer 102 can be used as a resistor. Such resistor can be formed by using a P type base layer as the semiconductor layer or by using an N type emitter layer. As shown in FIG. 6, capacitors 51 and 61 can be formed by forming by diffusion an N type layer 101 and an N+ channel layer 105 on a P type substrate 100, applying a silicon oxide film 103 on the diffused area of the substrate 100, forming a perforation through the silicon oxide film 103 on the N+ type layer 105 and vapour depositing electrically isolated aluminum films 104 onto the silicon oxide film 103. A capacitance is provided between the electrically isolated aluminum films. Alternatively, as shown in FIG. 7, an N type layer 101 and a P type layer 102 are formed on a P type substrate 100, an N+ type layer 106 is formed in a portion of the N type layer 101, a silicon oxide layer 103 is applied on the assembly except the P type layer 102 and the N+ type layer 106 and then these layers 102 and 106 are covered by vapour deposited aluminum films 104 to form terminal electrodes. In this construction, the junction capacitance between the P type layer 102 and the N type layer 101 can be used. Of course, the peripheries of the P channel layer 102 and N+ type layer 106 are covered by the oxide film 103. When the capacitors 51, 61 and the resistors 50, 60, that is, the component elements of the phase shifters 14 and 22 and the elements (transistors) of the mixing circuit 23 and automatic phase adjusting circuit 18 are formed on the same semiconductor substrate, the values of capacitors 51 and 61 are either increased or decreased and the values of resistors 50 and 60 are also increased or decreased due to process variations. In other words, the variation in phase shift $\phi_{HO}$ provided by the phase shifter 22 is increased when the variation in the phase shift $\phi_p$ provided by the phase shifter 14 is increased or vise versa. Thus the difference between $\Delta\phi_{HO}$ and $\Delta\phi_p$ becomes extremely small. Accordingly, variations caused by the phase shifters 14 and 22 exert no substantial influence on adjustment of the demodulation phase.

When the capacitances of the capacitors 51 and 61 of the phase shifters 14 and 22 are made equal ($C_1 = C_2$) and the resistances of the resistors 50 and 60 are also made equal ($R_1 = R_2$), the following relationship is obtained.

$$\Delta\phi_p - \Delta\phi_{HO} = \frac{-\omega}{1 + C_0 R_0} \{\Delta(C_2 R_2) - \Delta(C_1 R_1)\} \quad (12)$$

where $C_0 = C_1 = C_2$, $R_0 = R_1 = R_2$ and $\Delta(C_2 R_2)$ and $\Delta(C_1 R_1)$ represent the variations of $C_2 R_2$ and $C_1 R_1$ respectively.

Since $\Delta(C_2 R_2) \approx \Delta(C_1 R_1)$ equation (12) results $$\Delta\phi_p \approx \Delta\phi_{HO}$$

This means that the variation of the hue adjusting circuit 21 can be neglected. In other words, even when the process variations of capacitors 51 and 61 and resistors 50 and 60 of the phase shifters are great the hue adjustment is not substantially affected. This feature is extremely advantageous for incorporating the phase shifters into an integrated circuit and makes easy to design the circuit. Incorporation of the phase shifter into an integrated circuit decreases the number of terminal pins of integrated circuit.

Figure 8:
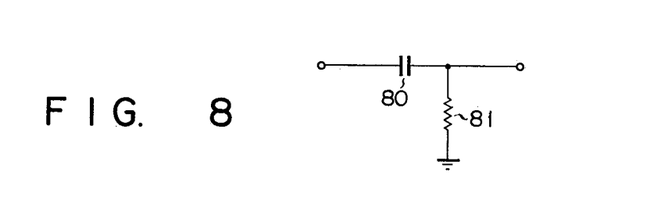
FIG. 8 is a connection diagram showing a modified phase shifter.

In the foregoing example the phase shifters 14 and 22 were described as phase delaying type, but they may be constructed as phase advancing type by connecting a capacitor 80 on the input side and a resistor 81 on the output side as shown in FIG. 8. Further, one of the phase shifters may be of the phase delaying type and the other phase shifter the phase advancing type.

FIG. 9 shows a modification in which the relative position of the automatic phase adjusting circuit 18 and the hue adjusting circuit 21 is reversed from that shown in FIG. 1. More particularly, in the circuit shown in FIG. 1, the automatic phase adjusting circuit 18 is connected to the output of the burst gate circuit 13 and the hue adjusting circuit 21 is connected to the output of the automatic phase adjusting circuit 18, but in the circuit shown in FIG. 9, the phase shifter 22 of the automatic hue adjusting circuit 21 is connected to the output of the burst gate circuit 13 and the mixing circuit 23 is connected to the output of the phase shifter 22 and the output of the burst gate circuit 13. The output of the mixing circuit 23 is connected to the phase detection circuit 19 of the automatic phase adjusting circuit 18 and the output of the phase detection circuit 19 is connected to the voltage-controlled oscillator 20 having an output connected to the demodulator 16. The connection of the other circuit elements is the same as that shown in FIG. 1. The circuit shown in FIG. 9 can be constructed in the same manner as FIG. 2 and operates in the same manner as the circuit shown in FIG. 1.

Instead of connecting the phase shifter 14 between the burst gate circuit 13 and the chroma signal amplifier 15, it can also be connected between the amplifier 15 and the demodulator 16.

Figure 10:
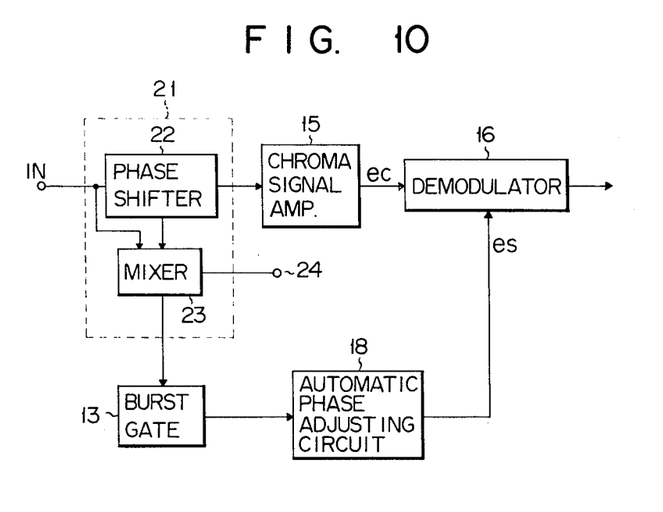
FIG. 10 is a block diagram of another embodiment of the signal processing circuit according to this invention.

FIG. 10 shows still another embodiment of this invention. In FIG. 10 the same reference numerals are employed to designate parts or elements corresponding to those shown in FIG. 1. This embodiment is substantially similar to that in FIG. 1 except that the hue adjusting circuit 21 is connected to the chroma signal input IN. The output of the phase shifter 22 is connected to a chroma signal amplifier 15, and the output of the hue adjusting circuit 21 is connected to the burst gate 13 whose output is connected to the automatic phase control circuit 18.

With $\phi_{p1}$ representing a phase shift provided by the phase shifter 22 to the signal applied to the chroma signal amplifier 15 and $\phi_{p2}$ a phase shift provided by the shifter 22 to the signal applied to the mixer 23 the following relationships are obtained.

$$\phi = \theta_c - \theta_s = \phi_{p1} + \phi_2 - (\phi_1 + \phi_4 + \phi_{HO} + \beta\psi) \quad (13)$$

$$\phi_0 = (\phi_2 - \phi_1 - \phi_4) + (\phi_{p1} - \phi_{HO}) \quad (14)$$

Where $\phi_1$ is a phase difference between the input and output of the burst gate circuit 13, $\phi_2$ is a phase difference between the input and output of the chroma amplifier 15 and $\phi_4$ is a phase difference between the input and output of the automatic phase adjusting circuit 18. With $\phi_{k1} = \phi_2 - \phi_1 - \phi_4$, $\phi_{k1}$ is determined by the circuit. Like Equation (5), $$\Delta\phi_0 = \Delta\phi_{k1} + (\Delta\phi_{p1} - \Delta\phi_{HO}) \quad (15)$$

$\Delta\phi_{HO}$ is a sum of the variations of the phase shiter 22 and mixer 23. If $\Delta\phi_{HO}$ is almost all responsible for the variation of phase shifter 22, $$\Delta\phi_{HO} = \Delta\phi_{p2} \quad (16)$$

Substituting equation (16) into equation (15) yields $$\Delta\phi_0 = \Delta\phi_{k1 + (\Delta\phi_{p1} - \Delta\phi_{p2})} \quad (17)$$

$\phi_{p1}$, $\phi_{p2}$ are determined by the phase shifter 22. Since $\phi_{p1}$, $\phi_{p2}$ are determined by common elements, when the variation of each element occurs, variations $\Delta\phi_{p1}$ and $\Delta\phi_{p2}$ are in the same direction and in proportion to each other. When $$\Delta\phi_{p1} = K\Delta\phi_{p2} \ (K: \text{a proportional constant}) \quad (18)$$

then $$|\Delta\phi_0|_M \uparrow |\Delta\phi_{k1}|| + ||\Delta\phi_{p1}| - |\Delta\phi_{p2}||_M$$
$$= |\Delta\phi_{k1}| + |k - 1| |\Delta\phi_{p2}|_M \quad (19)$$

From the equation (16), equation (19) is reduced to $$|\Delta\phi_0|_M = |\Delta\phi_{k1}|_M + |k - 1| \cdot |\Delta\phi_{HO}|_M \quad (20)$$

where the suffix M represents maximum. If $k \approx 1$, then $$|\Delta\phi_0|_M \approx |\Delta\phi_k|_M$$

and thus an influence from the variation of phase shift caused by the hue control circuit 21, $|\Delta\phi_{HO}|$, can be eliminated.

Figure 11:
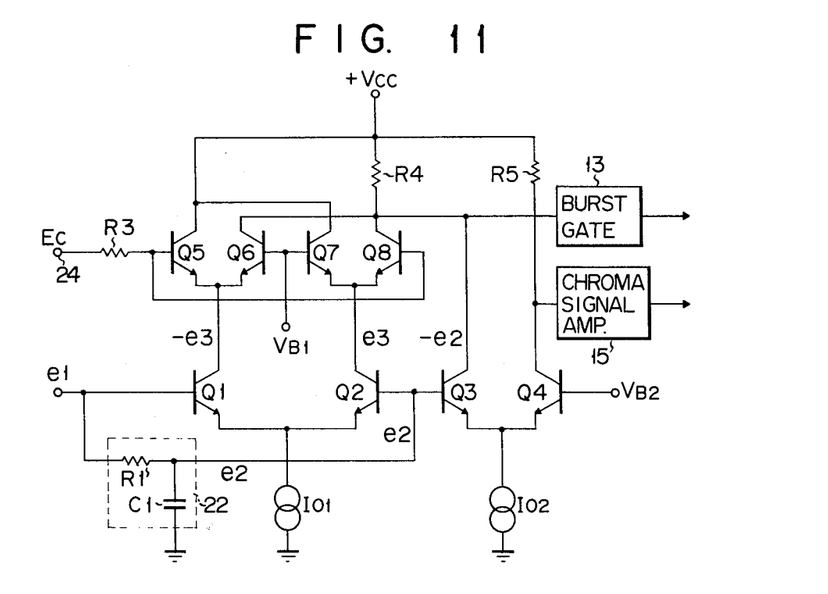
FIG. 11 is a circuit diagram of the phase shifter and mixing circuit of FIG. 10.
Figure 12:
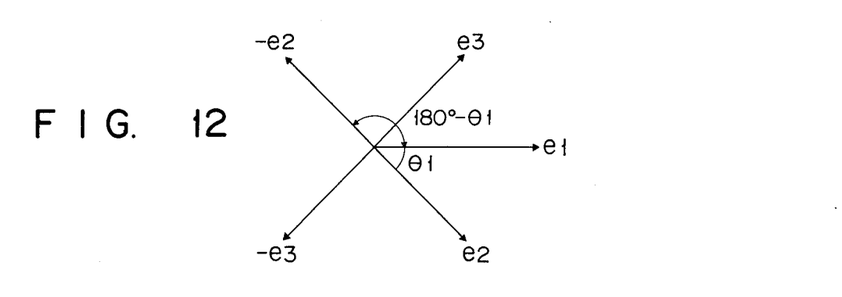
FIG. 12 is a vector diagram showing the operation of the circuit of FIG. 11.

FIG. 11 shows a practical circuit of the phase shifter 22 and mixer 23 of FIG. 10. FIG. 12 is a vectorial diagram showing a phase relation of various signals in the circuit in FIG. 11. In FIG. 11, a resistor $R_1$ and capacitor $C_1$ correspond to the phase shifter 22 and the remaining portion of the circuit in FIG. 11 corresponds to the mixer 23 and an amplification stage of part of the chroma signal amplifier 15. With $e_1$ representing an input signal of the hue control circuit, the input signal $e_1$ is phase shifted or delayed by $\theta_1$ by the phase shifter 22 to obtain a signal $e_2$. The signals $e_1$ and $e_2$ are subjected to subtraction by a differential amplifier consisting of transistors $Q_1$ and $Q_2$ and signals $-e_3$, $e_3$ are produced from the collectors of transistors $Q_1$ and $Q_2$. A double-balanced type differential amplifier comprising transistors $Q_5$, $Q_6$ and $Q_7 Q_8$ varies the relative amplitude ratio of the signals $-e_3$ and $e_3$, and the signals $-e_3$ and $e_3$ are added at the collectors of transistors $Q_6$ and $Q_8$. Ec represents a control voltage and $\beta = 0$ when $Ec = V_{B1}$. On the other hand, the signal $e_2$ is converted, by a differential amplifier of transistors $Q_3$ and $Q_4$, to a signal $-e_2$. The signal $-e_2$ from the transistor $Q_3$ is synthesized mixed with collector outputs of transistors $Q_6$ and $Q_8$ at a common collector junction of the transistors $Q_6$ and $Q_8$ and the mixed signal is fed to the burst gate 13. The signal $e_2$ is, after being amplified by the transistor $Q_4$ of the differential amplifier, connected to the chroma signal amplifier 15. In FIG. 11, $I_{01}$ represents a constant current source of the transistors $Q_1$ and $Q_2$, and $I_{02}$ a constant current source of the transistors $Q_3$ and $Q_4$. $R_1$ to $R_5$ denote resistors.

When the variable control voltage Ec has a center value, i.e., $Ec = V_{B1}$, the input phase of the burst gate circuit 13 becomes the phase of the signal $-e_2$. Thus, $$\phi_{p1} = \theta_1 \quad \theta_{p2} = 180° - \theta_1 \quad (22)$$

$$\Delta\phi_{p1} = \Delta\theta_1 \quad \Delta\phi_{p2} = -\Delta\theta_1 \quad (23)$$

$$||\Delta\phi_{p1}| - |\Delta\phi_{p2}|| = ||\Delta\theta_1| - |-\Delta\theta_1|| = 0 \quad (24)$$

This corresponds to a case where $k = 1$ in the equation (20).

Figure 13:
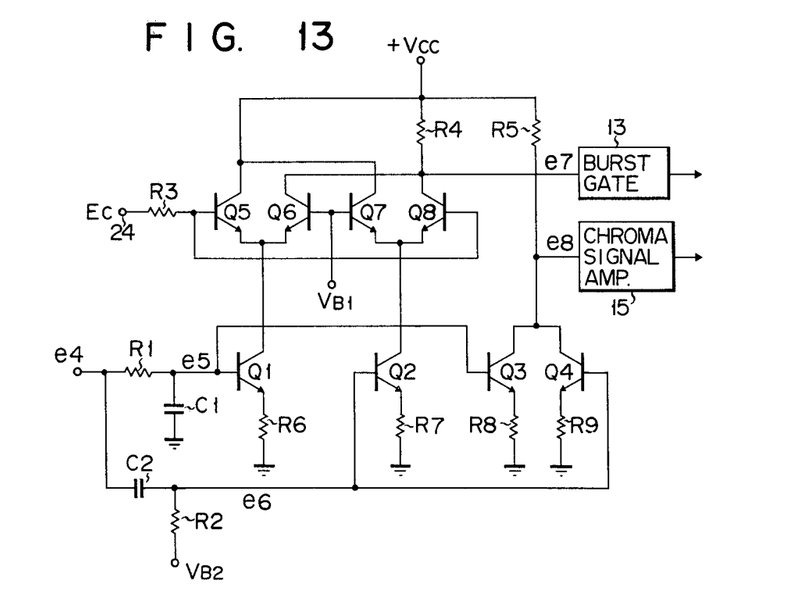
FIG. 13 is a modified circuit diagram of FIG. 11.

FIG. 13 is a modification of FIG. 11. With $\dot{e}_4$ representing an input to the hue control circuit, the signal $\dot{e}_4$ is phase lagged an amount of $\theta_2$ by a resistor $R_1$ and capacitor $C_1$ to produce a signal $\dot{e}_5$ and phased-advanced an amount of $\theta_3$ by a capacitor $C_2$ and resistor $R_2$. Transistors $Q_5$ to $Q_8$ constitute a double-balanced type differential amplifier. With $\dot{e}_7$ representing an input signal to the burst gate 13, $\dot{e}_7$ can be expressed as follows:

$$\dot{e}_7 = -(k_1 \alpha \dot{e}_5 + k_2(1-\alpha)\dot{e}_6) \quad (25)$$

where $\alpha$: variable changed by a control voltage Ec $k_1, k_2$: transfer constants On the other hand, an input signal $\dot{e}_8$ to the chroma amplifier 15 is $$e_8 = -(k_3 e_5 + k_4 e_6) \quad (26)$$

where $k_3$, $k_4$: trnasfer constants

Figure 14:
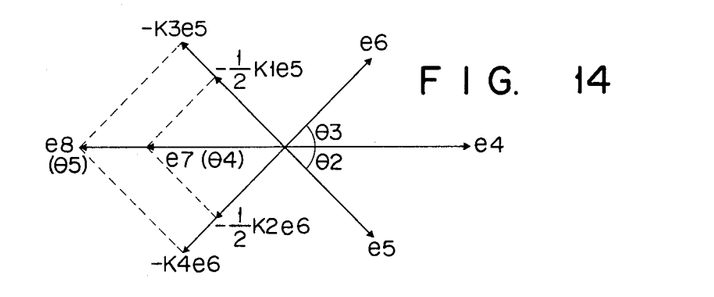
FIG. 14 is a vector diagram showing the operation of the circuit of FIG. 13.

When $Ec = V_{B1}$, $\alpha = \frac{1}{2}$. Suppose that at this time a proper demodulation phase is obtained. If in this case the transfer constants are set to $$k_1 : k_2 = k_3 : k_4, \quad (27)$$

the phase $\theta_4$ and $\theta_5$ of signals $e_7$ and $e_8$ are equal to each other as shown in FIG. 14 and, even if the variations of $R_1$, $C_1$, $R_2$ and $C_2$ occur, the signals $e_7$ and $e_8$ hold the same phase. That is, $\Delta\theta_4 = \Delta\theta_5$, which corresponds to $\Delta\phi_{p1} = \Delta\phi_2$. This corresponds to the case of $k = 1$, in the equation 18. The requirement of equation (24) is easily satisfied in an integrated circuit.

What we claim is:

1. A signal processing circuit for use in a color television receiver comprising:

demodulator circuit means connected to receive a chroma signal and a subcarrier reference signal for recovering color information from the chroma signal;

first phase shifting means connected to the input side of said demodulator circuit means for phase shifting the chroma signal to be applied to said demodulator circuit means;

subcarrier reference signal generating means responsive to a burst signal derived from a color composite signal including the chroma and burst signals for producing a subcarrier reference signal;

hue adjusting circuit means connected to the output of said subcarrier reference signal generating means and including a second phase shifting means for phase shifting the subcarrier reference signal and mixing means connected to receive and mix the phase-shifted subcarrier reference signal from said second phase shifting means and the subcarrier reference signal from said subcarrier reference signal generating means, said mixing means being arranged to vary the relative amplitude ratio between the subcarrier reference signal from said subcarrier reference signal generating means and the phase-shifted subcarrier sreference signal from said second phase shifting means in response to a control voltage; and means for coupling the output of said mixing means to said demodulation means to recover the color information from the chroma signal;

at least said first and second phase shifting means being formed on the same integrated circuit semiconductor substrate.

2. A signal processing circuit according to claim 1, wherein said first and second phase shifting means each include a combination of resistance and capacitance.

3. A signal processing circuit according to claim 1, wherein said mixing means includes a first differential amplifier having first and second transistors whose emitters are connected together and bases are respectively connected to said subcarrier reference signal generating means and said second phase shifting means, a second differential amplifier having third and fourth transistors whose emitters are connected together to the collector of said first transistor, a third differential amplifier having fifth and sixth transistors whose emitters are connected together to the collector of said second transistor, the bases of said third and sixth transistors being connected to receive the control voltage and, the bases of said fourth and fifth transistors being connected to a first bias voltage source, and the collectors of said fourth and sixth transistors being connected to output of said mixing means, and a fourth differential amplifier having seventh and eighth transistors whose emitters are connected together, the base of said seventh transistor being connected to the base of said second transistor, the base of said eighth transistor being connected to a second bias voltage source, and the collector of said eighth transistor being connected to the collectors of said fourth and sixth transistors.

4. A signal processing circuit for use in a color television receiver comprising:
demodulator circuit means connected to receive a chroma signal and a subcarrier reference signal for recovering color information from the chroma signal;
first phase shifting means connected to the input side of said demodulator circuit means for these shifting the chroma signal to be applied to said demodulator circuit means;
hue adjusting circuit means including a second phase shifting means connected to receive a burst signal derived from a color composite signal including the chroma and burst signals for phase shifting the burst signal and mixing means connected to receive and mix the phase-shifted burst signal from said second phase shifting means and the burst signal, said mixing means being arranged to vary the relative amplitude ratio between the phase shifted burst signal and the burst signal to be applied to said second phase shifting means in response to a control voltage;
subcarrier reference signal generating means connected to the output of said mixing means for producing the subcarrier reference signal; and
means for coupling the output of said subcarrier reference signal generating means to said demodulator circuit means;
at least said first and second phase shifting means being formed on the same integrated circuit semiconductor substrate.

5. A signal processing circuit according to claim 4, wherein said first and second phase shifting means each includes a combination of resistance and capacitance.

6. A signal processing circuit according to claim 4, wherein said mixing circuit including a first differential amplifier having first and second transistors whose emitters are connected together and bases are respectively connected to receive the burst signal and the phase-shifted burst signal, a second differential amplifier having third and fourth transistors whose emitters are connected together to the collector of said first transistor, a third differential amplifier having fifth and sixth transistors whose emitters are connected together to the collector of said second transistor, the bases of said third and sixth transistors being connected to receive the control voltage and, the bases of fourth and fifth transistors being connected to a first bias voltage source, and the collectors of said fourth and sixth transistors being connected to said subcarrier reference signal generating means, and a fourth differential amplifier having seventh and eighth transistors whose emitters are connected together, the base of said seventh transistor being connected to the base of said second transistor, the base of said eighth transistor being connected to a second bias voltage source, and the collector of said eighth transistor being connected to the collectors of said fourth and sixth transistors.

7. A signal processing circuit for use in a color television receiver comprising:
hue adjusting circuit means including phase shifting means connected to receive a color composite signal having chroma and burst signals for phase shifting the composite signal, and mixing means connected to receive and mix the composite signal and the phase-shifted composite signal, said mixing means being arranged to vary the relative amplitude ratio between the composite signal and the phase-shifted composite signal in response to a control voltage;
burst gate means connected to said mixing means for deriving the burst signal from the composite signal;
subcarrier reference signal generating means responsive to the burst signal from said burst gate means for producing a subcarrier reference signal;
chroma signal amplifier connected to said phase shifting means;
demodulator means coupled to said chroma signal amplifier and said subcarrier reference signal generating means for recovering color information from the chroma signal.

8. A signal processing circuit for use in a color television receiver comprising:
phase shifting means connected to receive a color composite signal having chroma and burst signals for differently phase shifting the composite signal;
first mixing means connected to receive and mix differently phase-shifted composite signals from said phase shifting means and arranged to vary the relative amplitude ratio between the differently phase-shifted composite signals in response to a control voltage;
second mixing means connected to receive and mix the differently phase-shifted composite signals from said phase shifting means;
burst gate means connected to said first mixing means for deriving the burst signal from the output signal of said first mixing means;
a chroma signal amplifier connected to said second mixing means;
subcarrier reference signal generating means connected to receive said burst signal for producing a subcarrier reference signal; and
demodulator circuit means coupled to said chroma signal amplifier and said subcarrier reference signal generating means for recovering color information from the output signal of said chroma signal amplifier.

* * * * *